Aug. 12, 1952 A. TCHAOUSSOGLOU 2,606,540
COOLING SYSTEM FOR INTERNAL-COMBUSTION ENGINES
Filed Oct. 6, 1949
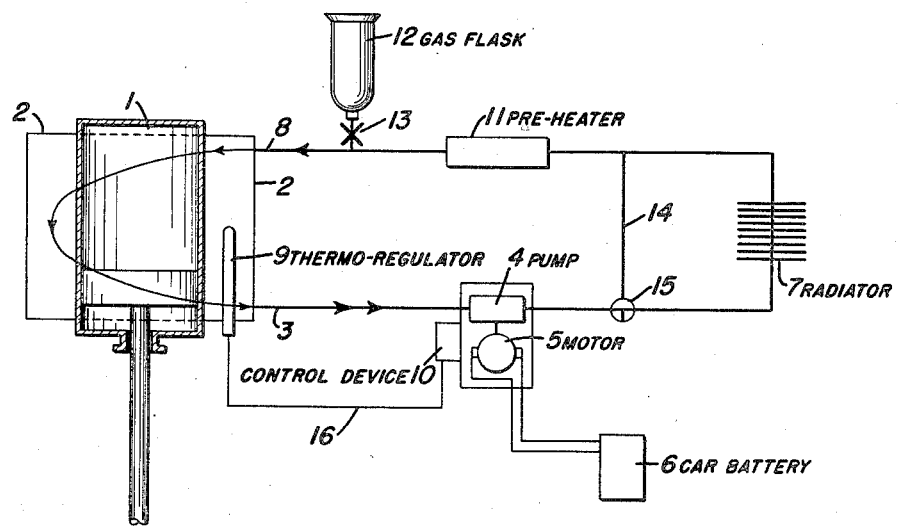
INVENTOR.
ALEXANDER TSCHAOUSSOGLOU
BY
ATTORNEY Patented Aug. 12, 1952

2,606,540

UNITED STATES PATENT OFFICE 2,606,540

COOLING SYSTEM FOR INTERNAL-COMBUSTION ENGINES

Alexander Tchaoussoglou, Baden, Germany

Application October 6, 1949, Serial No. 119,860
In Germany May 24, 1949

6 Claims. (Cl. 123—41.63)

1

The present invention relates to cooling systems for internal combustion engines both of the stationary and of the non-stationary type, the latter type including gasoline (Otto) motors, diesel motors, gas turbines, jet combustion engines etc.

Conventionally the combustion chambers of internal combustion engines are cooled by water or atmospheric air. Where water is used the combustion chambers are surrounded by a cooling jacket through which the water is circulated. If no fresh water is available, as is the case where the engine is the power source for a movable vehicle, the cooling water is passed, in a closed circuit, through an air-cooled radiator and then returns to the water jacket again. If atmospheric air is used as a cooling medium the outside walls of the combustion chambers in non-stationary machines are provided with cooling ribs or fins which transmit the developed heat to the passing current of air during movement of the vehicle or other apparatus on which the engine is used. In order to secure sufficient cooling action also during the periods of rest of the vehicle, means are often provided for blowing air against the walls of the combustion chambers.

The use of atmospheric air as a cooling medium has the disadvantage of insufficient adaptability to various and changing operating and weather conditions: in cool weather the cooling action is too great, and in hot weather, particularly where the car is being driven slowly and in mountainous country, overheating of the motor often occurs. Furthermore, after long periods of rest and under frigid weather conditions, starting is often difficult because there is no means for preheating the combustion chambers of the engine.

Similar difficulties are met with if water is used as a cooling medium; in the winter even protective additives are no certain remedy against freezing, while under hot working conditions, as where the engine is heavily loaded, the cooling medium is liable to overheat and boil, causing severe damage to the motor.

To overcome these objections attempts have been made in the past to vary the feeding volume of the cooling medium in accordance with the changing mechanical power exerted by the engine, for which purpose the device for feeding the cooling medium through the cooling circuit has been operatively connected with the engine. Since the number of revolutions has no direct relationship to the heat developed, however, it has not been possible, in this way, to maintain the engine, under all conditions of load and regardless of the R. P. M. of the engine, automatically at the optimal operating conditions. The objections to conventional cooling system might be overcome, also, at least to a considerable degree, by means of a control which would automatically regulate the fed volume of the cooling medium in accordance with the temperature thereof. However, in view of the relatively high driving power which would be required for operating the feeding device for passing water or air through the cooling circuit, the whole mechanism would become too cumbersome and too expensive.

The primary object of the present invention is to provide a highly efficient cooling system for internal combustion engines which has improved cooling properties and increased adaptability to varying operating conditions and which, at the same time, avoids a number of disadvantages involved with the cooling systems hitherto used.

Other objects of the invention will appear hereinafter from the specification and from the recital of the appended claims.

The invention provides a cooling system for internal combustion engines in which a gas or a gaseous mixture having a specific weight as low as possible and a specific heat as high as possible is used as a cooling medium and this medium is continually passed, by means of a power driven feeding mechanism, through a closed cooling circuit. Cooling mediums of this kind with a specific weight below 1.5 lbs./cu. yard and a specific heat above 0.18 kcal./pound are, or substantially consist of, hydrogen, helium, or mixtures of one of these gases with the other and/or with an inert gas, such as nitrogen, or a noble gas such as neon. The addition of inert gases is particularly desirable where hydrogen is used as the basic cooling medium in order to remove any danger resulting from the inflammability of hydrogen and of high hydrogen mixtures. The proportion of the constituents of the mixture other than hydrogen or helium is so calculated that the above limits of specific weight and heat in the whole mixture are not exceeded. Preferably no more than twenty per cent of volume of such diluting gases are employed. If helium is used alone a diluting gas may be dispensed with.

In order to avoid undesired gases from entering the cooling circuit, a slight excess pressure is maintained in said circuit, e. g. by means of a container in which the gaseous cooling medium is held under suitable pressure and which is connected through a pressure limiting valve with said circuit. In this way, any leakage is also automatically compensated.

Hydrogen as a cooling medium has already been used in turbogenerators for the purpose of diminishing the retarding effect which is exercised on the rotor by air as a cooling medium by the relatively high viscosity of air. According to the present invention, however, the light gases mentioned serve as a continuously circulated cooling medium in a closed cooling circuit of an internal combustion engine. In automobile motors, for instance, the water cooling system remains, in principle, unchanged, with the exception that the cooling circuit is no longer filled with water, but with a cooling gas such as indicated. The diameters of the conduits in the cooling circuit must, of course, be changed because of the use of gas, e. g. they should have a free width of 2.36 inches inside diameter for gas instead of the 0.78 inches inside diameter commonly used where water is employed as the coolant. A small feeding device, e. g. a pump or a suitable blower, serves for continuously passing the cooling medium through the closed circuit. The feeding device is driven by a driving mechanism which is not, as hitherto sometimes provided, driven by the motor itself, but independently therefrom.

From the foregoing features the following advantages result over the prior cooling systems operating with water or air; as the specific weight and the viscosity of the cooling gases are considerably smaller and their specific heat considerably higher than air, it is possible to remove a great quantity of heat from the internal combustion engine with a relatively small quantity of cooling gas. This is all the more true because the speed of the gas in the conduits and in the radiator may be very high even with a very small power supply. The energy required for circulating hydrogen for removing a certain quantity of heat is only the fiftieth part of the energy which would be required for circulating air to remove the same quantity of heat. For giving an idea of the conditions with other gases or mixtures of gases the following items may be compared: for cooling the motor of a car with a fuel consumption of 8.5 gallons per 100 statute miles, i. e. about 4.2 gallons an hour, the following power is required with various cooling gases under the proviso that the same diameters of conduits be provided:

| Cooling Medium | $H_2$ | He | $H_2$/He | $H_2$/Ne | Air |
|---|---|---|---|---|---|
| Watt | 6.2 | 62 | 12.3 | 48 | 1,200 |

In view of the low specific weight of the cooling medium to be fed through the circuit by the blower the latter may be driven economically by an electric motor which is, independent of the internal combustion engine, and which is supplied with current from the starter-light-battery. In this way, it is possible to adapt the blowing power, i. e. the cooling effect, to any quantity of heat to be removed, irrespective of the number of revolutions of the internal combustion engine. The speed of the blower may be automatically controlled by a thermo-regulator under the influence of the temperature of the combustion chamber or of the temperature of the cooling medium in the jacket surrounding the combustion chamber.

For facilitating the starting of the internal combustion engine in cold weather a preheating device may be provided by which the gaseous medium in the circuit is heated. A source of heat, independent of the internal combustion engine, e. g. an oil burner or an electric heating device, may serve for heating the cooling medium sufficiently so that when said medium is passed by means of the feeding device through the jacket surrounding the combustion chamber said chamber may be brought to the suitable starting temperature. During the preheating period the radiator in the cooling circuit may be shunted to avoid losses of heat. As the mass of the cooling or preheating medium, respectively, is small and the speed of said medium in the circuit is great, quick preheating of the combustion chamber and facilitated starting of the motor is insured.

For practical use, the necessary heating equipment may be provided for instance in any gasoline station, garage etc. The same applies to the necessary stock of gases as hydrogen, helium and suitable mixtures for supplying motor cars with the cooling gases wanted, for compensating leakages thereof, for exchanging transportable pressure flasks in which the gases may be carried etc. The volume of gas necessary for filling the cooling system of a car middle size is no more than 1.0 cu. ft., i. e., 1.9 oz. of helium or 0.95 oz. of hydrogen.

By way of example a schematic illustration of a preferred embodiment of the invention is given in the accompanying drawing:

1 designates the combustion chamber of an internal combustion machine, e. g. an automobile motor. This chamber is surrounded by a jacket 2 containing the cooling medium, e. g. helium gas. A suitably shaped outlet conduit 3 leads to a closed tube circuit. A gas feeding mechanism e. g. a blower or pump 4, serves for feeding the gas through said circuit. The pump is driven by a small electric motor 5 connected to the poles of the battery 6 of the car. In normal action the gas is drawn off in the direction of the double arrow from the cooling jacket 2 and fed to a radiator 7 from where the cooled gas is returned through the inlet 8 to the jacket 2. A thermo-regulator 9 of a construction known per se is mounted in the jacket 2 for indicating the temperature of the gas in the jacket. The regulator, e. g. of the thermo-electric type, may serve for controlling the operation of the feeding device by means of controlling device 10 operatively connected on the one side with the thermo-regulator, e. g. by electrical means (cable 16), and on the other side with the feeding device 4, 5. The control device 10 regulates, in a manner known per se, the feeding action of the feeding pump 4 or its driving motor 5 respectively, so that the feeding action is greater if more heat is to be removed and vice versa. In the cooling circuit a preheating device 11, e. g. an oil burner or an electrical heating device, is provided for the purpose of preheating the cooling medium in the circuit and thereby the combustion chamber. For making the radiator 7 ineffective during the preheating period a shunt 14 is provided in the circuit. A pivotable cock 15 having a T-bore allows passing the cooling medium from the outlet conduit 3 either through the radiator (cooling position, as in the drawing) or directly to the inlet conduit 8 (preheating position).

For maintaining a slight excess pressure in the circuit for compensating for any losses resulting from leakage and so on, an exchangeable gas flask 12 is connected through a suitable pressure-reducing valve 13 with the circuit.

Obviously, the system described is provided with a suitable opening for removing the air when the circuit is filled. Likewise, different changes may be made in the construction as the case may require, the above scheme serving only for giving an idea of the principle of the invention without limiting the same to the details described and illustrated.

Having thus described by invention, what I claim is:

1. The combination with an internal combustion engine having a combustion space, of a closed cooling system therefor containing a gaseous cooling medium comprising hydrogen, said closed cooling system comprising a closed jacket around the combustion space, a blower for circulating the cooling medium in the system, a duct connecting said jacket with said blower on the suction side of said blower, and a second duct connecting the pressure side of said blower with said jacket, and means for driving said blower.

2. The combination with an internal combustion engine having a combustion space, of a closed cooling system therefor containing a gaseous cooling medium comprising helium, said closed cooling system comprising a closed jacket around the combustion space, a blower for circulating the cooling medium in the system, a duct connecting said jacket with said blower on the suction side of said blower, and a second duct connecting the pressure side of said blower with said jacket, and means for driving said blower.

3. The combination with an internal combustion engine having a combustion space, of a closed cooling system therefor containing a gaseous cooling medium comprising a mixture of a light gas from the group comprising hydrogen and helium and of an inert gas from the group comprising nitrogen, helium and neon, said closed cooling system comprising a closed jacket around the combustion space, a blower for circulating the cooling medium in the system, a duct connecting said jacket with said blower on the suction side of said blower, and a second duct connecting the pressure side of said blower with said jacket, and means for driving said blower.

4. The combination with an internal combustion engine having a combustion space, of a closed cooling system therefor containing a gaseous cooling medium other than air, said closed cooling system comprising a closed jacket around the combustion space, a blower for circulating the cooling medium in the system, a duct connecting said jacket with said blower on the suction side of said blower, a second duct connecting the pressure side of said blower with said jacket, a container holding a surplus supply of the cooling medium under pressure, and a pressure-reducing valve connecting said container with one of said ducts, and means for driving said blower.

5. The combination with an internal combustion engine having a combustion space, of a closed cooling system therefor containing a gaseous cooling medium other than air, said closed cooling system comprising a closed jacket around the combustion space, a blower for circulating the cooling medium in the system, an air-coolable radiator, a duct connecting said jacket with the suction side of said blower, a duct connecting the pressure side of said blower with said radiator, a duct connecting said radiator with said jacket, a preheating unit through which said third duct passes, a by-pass duct connecting said third duct and said second-named duct, and a valve controlling connection of said by-pass duct with said second-named duct, said valve being operable to permit by-passing said radiator while said preheating unit is in operation.

6. The combination with an internal combustion engine having a combustion space, of a closed cooling system therefor containing a gaseous cooling medium other than air, said closed cooling system comprising a closed jacket around the combustion space, a blower for circulating the cooling medium in the system, a duct connecting said jacket with the suction side of said blower, and a duct connecting the pressure side of said blower with said jacket, an electric motor for driving said blower, and means mounted in said jacket for controlling through the temperature of the cooling medium in said jacket the operation of said blower.

ALEXANDER TCHAOUSSOGLOU.

REFERENCES CITED

The following references are of record in the file of this patent:

UNITED STATES PATENTS

| Number | Name | Date |
|---|---|---|
| 648,914 | Bertheau | May 8, 1900 |
| 1,376,086 | Fairman | Apr. 26, 1921 |
| 1,389,395 | Stuart | Aug. 30, 1921 |
| 1,523,199 | Hofmann | Jan. 13, 1925 |
| 1,890,745 | O'Connor | Dec. 13, 1932 |
| 2,210,049 | Thompson | Aug. 6, 1940 |
| 2,240,674 | Seitz | May 6, 1941 |

FOREIGN PATENTS

| Number | Country | Date |
|---|---|---|
| 301,615 | Germany | Apr. 16, 1920 |
| 307,156 | Germany | Sept. 28, 1920 |